United States Patent [19]
Brown

[11] Patent Number: 4,505,096
[45] Date of Patent: Mar. 19, 1985

[54] SWEEPING MACHINE WITH ARCUATE PADDLE OF FLEXIBLE MATERIAL

[76] Inventor: Phil Brown, 4689 - 8 Mile Rd., N.W., Conklin, Mich. 49403

[21] Appl. No.: 431,703

[22] Filed: Sep. 30, 1982

[51] Int. Cl.³ .............................................. A01D 51/00
[52] U.S. Cl. ..................................... 56/328 R; 56/377; 172/30
[58] Field of Search ............................. 172/29, 30, 39; 56/328 R, 370, 377; 15/87; 171/63, 65; 414/25, 132; 198/515

[56] References Cited

U.S. PATENT DOCUMENTS

| | | | |
|---|---|---|---|
| 3,754,603 | 8/1973 | Bogie | 172/125 X |
| 3,893,286 | 7/1975 | Buttram et al. | 56/328 R |
| 4,184,313 | 1/1980 | Broijl et al. | 56/370 |
| 4,397,135 | 8/1983 | Wattron | 56/370 X |
| 4,416,335 | 11/1983 | Lofgren et al. | 172/125 X |

FOREIGN PATENT DOCUMENTS

| | | | |
|---|---|---|---|
| 1941095 | 4/1971 | Fed. Rep. of Germany | 56/370 |
| Ad.90609 | 12/1967 | France | 56/370 |
| 1123731 | 8/1968 | United Kingdom | 56/370 |
| 2027574 | 2/1980 | United Kingdom | 56/370 |
| 891014 | 12/1981 | U.S.S.R. | 56/328 R |

Primary Examiner—Richard T. Stouffer
Attorney, Agent, or Firm—Glenn B. Morse

[57] ABSTRACT

The machine is attached to a standard tractor, and has a pair of sweeping rotors driven by an hydraulic system. The rotors are mounted on a pair of booms, respectively, pivotally connected to a structure carried by the tractor so that the booms can be swung laterally to selected positions determining the width of the path of operation. The weight of the rotors, and of the rear portions of the booms, is carried on skid discs forming part of each rotor.

3 Claims, 7 Drawing Figures

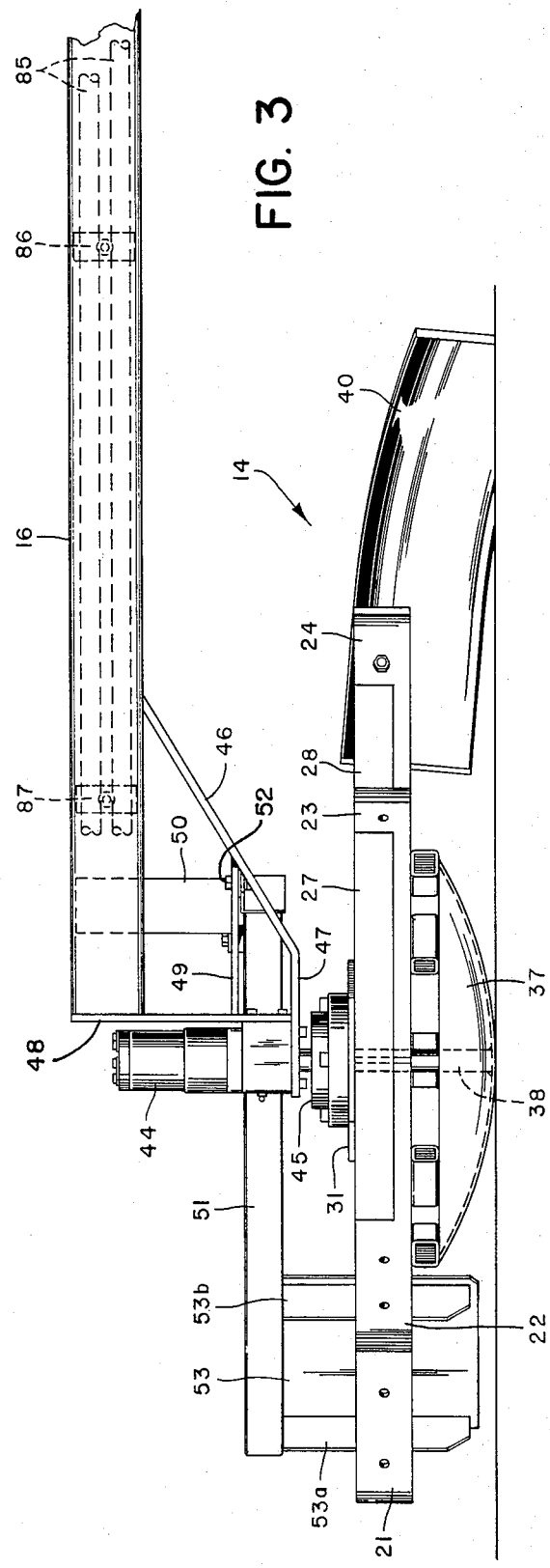
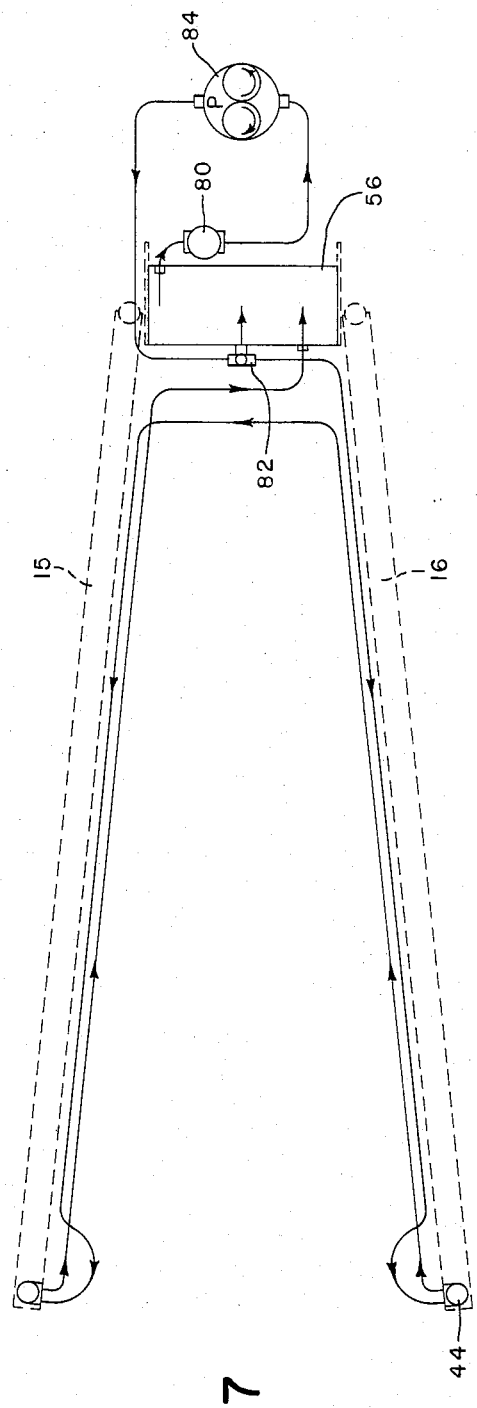

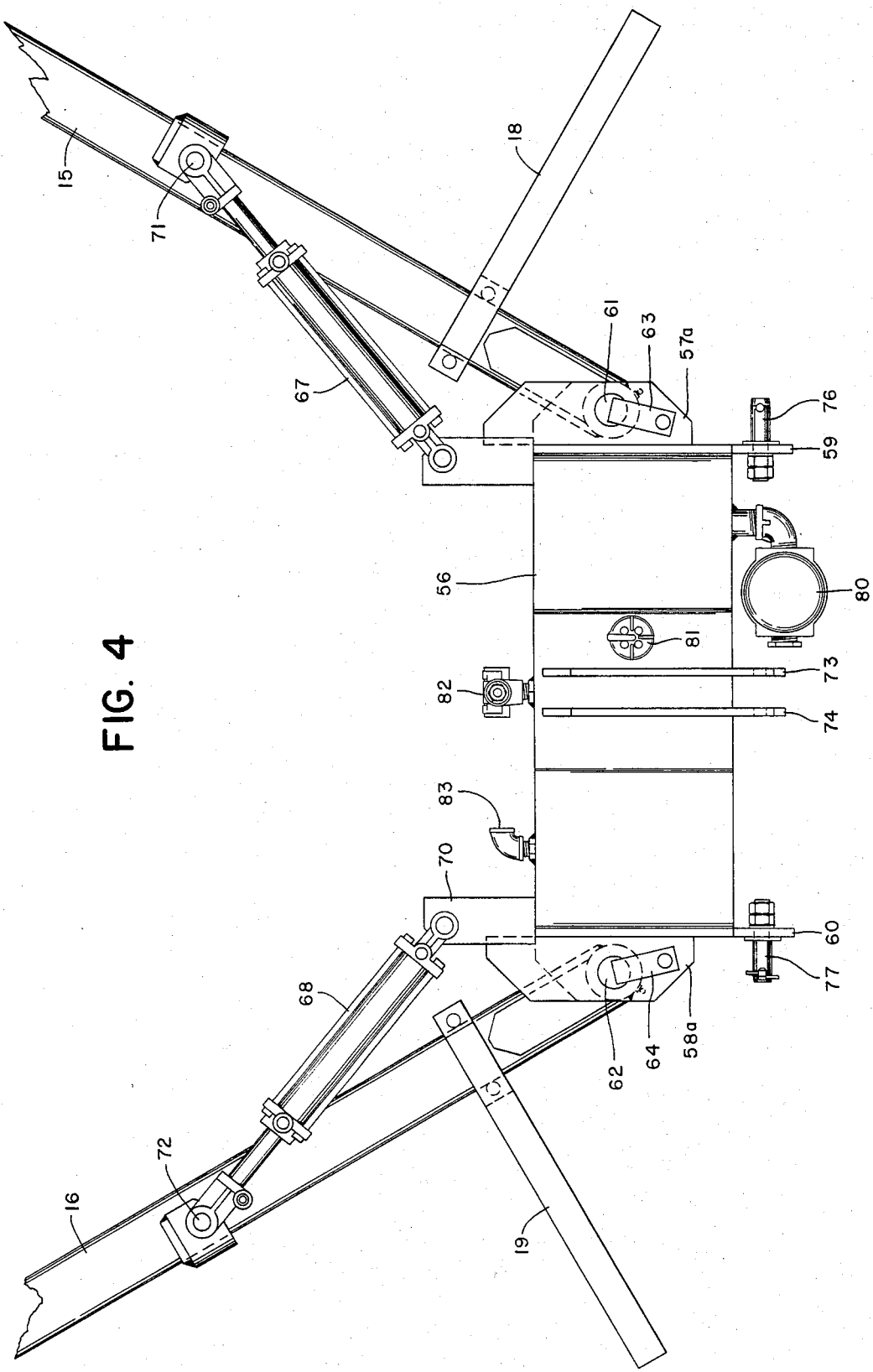

SWEEPING MACHINE WITH ARCUATE PADDLE OF FLEXIBLE MATERIAL

BACKGROUND OF THE INVENTION

Proper maintenance of an orchard involves frequently clearing the area under the trees from various kinds of trash. Trimmings resulting from the pruning of the trees, accumulations of fallen fruit, and even brush that may have taken root in this area, must be removed to provide access to the trees, and to facilitate spraying for weed control. It is also desirable to prevent the accumulation of rotting fruit for a number of obvious reasons. Clearing these areas has been an unpleasant and time-consuming manual operation resulting in considerable expense.

Mechanical sweeping machines have long been utilized in other types of operation, such as street cleaning. Various combinations of horizontal and vertical-axis rotary brushes have been utilized to remove trash and dirt from particular areas, and urge such material into other positions where it can be picked up by other parts of the machine. Such mechanism may be considered as typical of a wide variety of applications utilizing the principle of a substantially vertical-axis rotor to move material across the ground to a position where it is picked up for disposal. Frequently, the axis of the rotor is tipped slightly forward in order to engage the advancing side of the rotor with the ground, rather than the rear side. This arrangement tends to control the direction in which the loose material is moved across the ground.

SUMMARY OF THE INVENTION

This invention provides a machine forming an attachment to a standard farm tractor. A base structure is carried by the standard three-point implement linkage of a tractor for placement at selected distances above ground. A pair of booms is pivoted to the base structure on substantially vertical axes to allow the booms to be selectively swung laterally to determine the width of the path of operation of the machine. Substantially vertical-axis rotors are mounted at the outer extremity of the booms, together with deflector plates that cause material carried by the rotors to be deposited along a central row behind the tractor. A hydraulic motor on the tractor is supplied with fluid by a tank on the base structure, and drives the rotors through the usual hydraulic lines. The weight of the rotors, and of the rear portions of booms, is carried on skid discs forming the central portion of each of the rotors.

DESCRIPTION OF THE DRAWINGS

FIG. 3 is a side elevation with respect to FIG. 2.

FIG. 4 shows the forward portion of the booms, and the attachment to the base structure.

FIG. 7 is a schematic diagram of the hydraulic system.

DESCRIPTION OF THE PREFERRED EMBODIMENT

Figure 1:
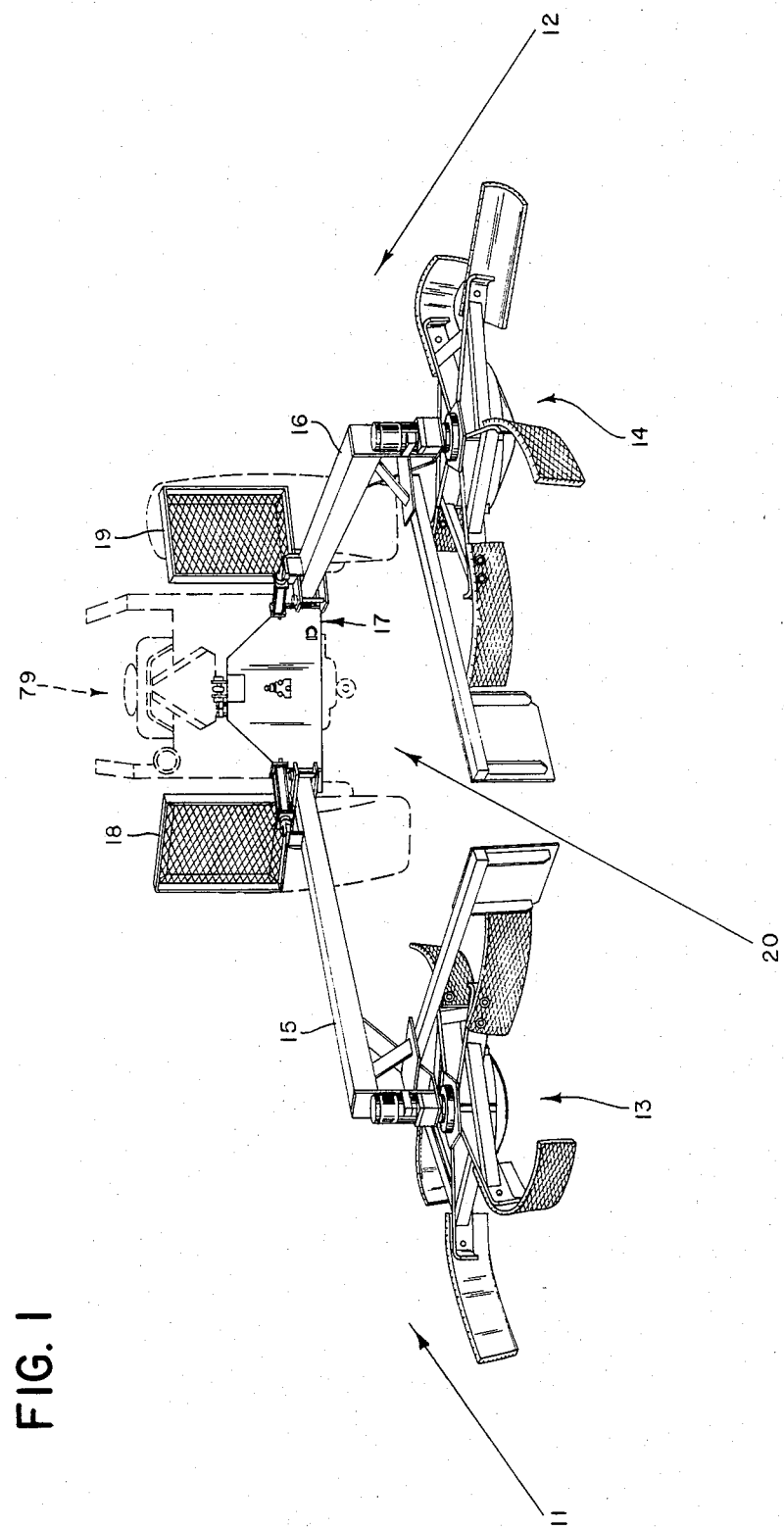
FIG. 1 is a perspective view from behind the machine, and looking forward along the path of operation.

Referring to FIG. 1 of the drawings, the tractor 79 is shown proceeding along the space between the rows of orchard trees 11 and 12. During this movement, the rotory sweeping elements 13 and 14 are clearing the areas underneath the trees from whatever trash may have accumulated there. The rotory members are mounted on booms 15 and 16, which are pivotally connected to a central base member 17 coupled to the tractor. The shields 18 and 19 carried by the booms protect the operator of the tractor from flying objects as the operation proceeds. The trash is deposited in a central row 20 behind the tractor. This row can either be collected by standard rake equipment, or processed with a machine to reduce it to small pieces.

Figure 2:
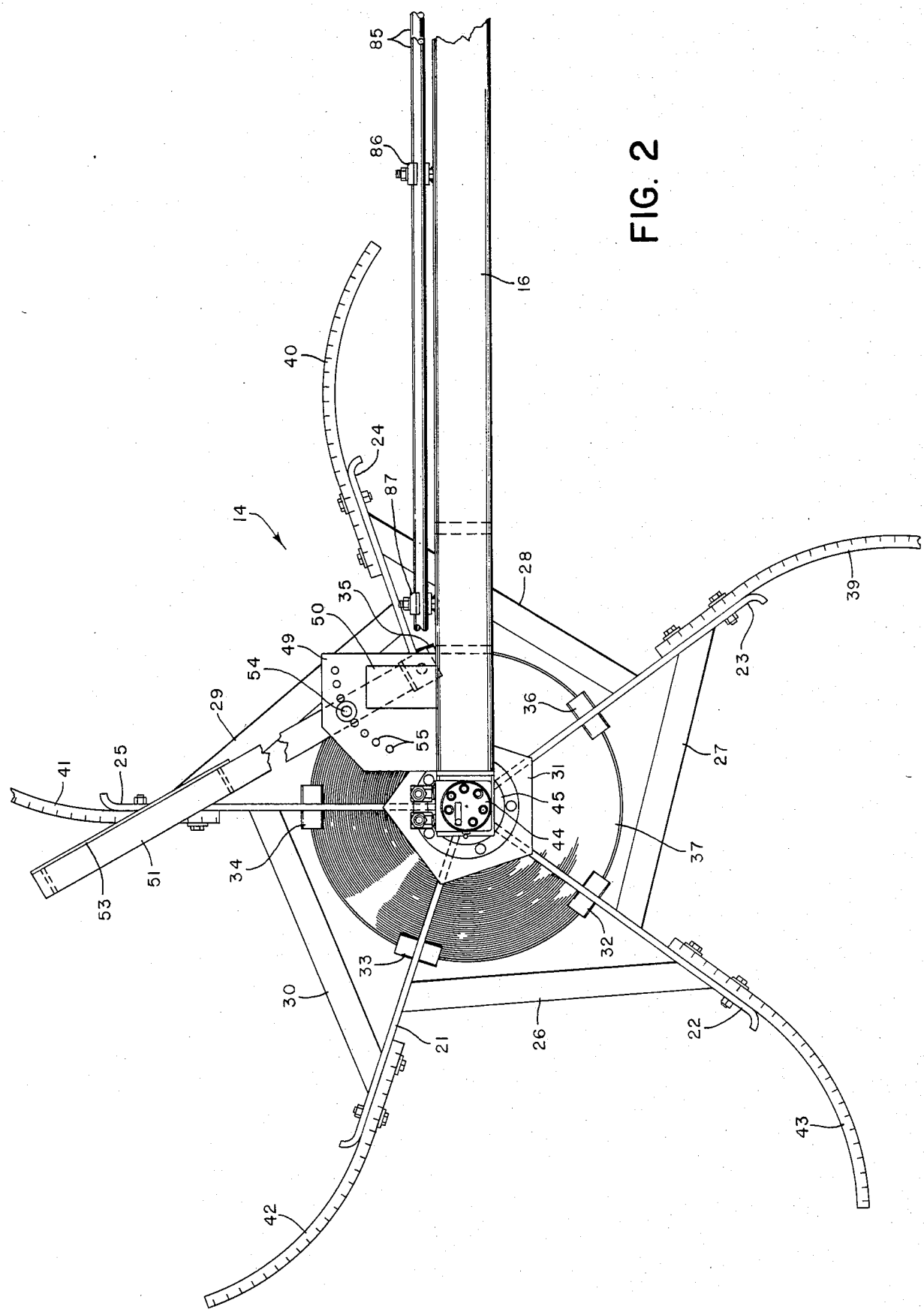
FIG. 2 is a top view of a sweeping rotor and the associated outer extremity of the boom.

The structure of the rotory sweeping devices forming the active components of the machine is best shown in FIGS. 2 and 3. These units are identical, and have a central frame including the radial members 21-25 interconnected by the tangential members 26-30. The central plate 31 forms the hub of the frame. These components are preferably welded together according to standard procedures. Short sections of square steel tubing indicated at 32-36 are welded to the radial members as reinforcements providing points of attachment for the rim of the convex-downward plate 37, which forms a skid supporting the weight of the rotor and the associated outer portion of the boom when the device is in operation. The shaft 38 extends to the bottom of this plate to provide some degree of reinforcement.

The sweeping action of the rotor is provided by the flexible elements 39-43, which are secured to the outer extremities of the radial frame members 21-25, respectively, by bolt or other convenient fastenings. Only one of these is shown in FIG. 3. These members are installed at a downward inclination and tend to wear into the configuration shown in FIG. 3. Preferably, these flexible members are formed by sections of old automobile tires. The outer extremities of the radial members 21-25 are preferably rounded to prevent to localized a bending of the flexible elements 39-43. The rotation of these rotors that generates the sweeping action is provided by the hydraulic motor 44 which has the shaft 38. This shaft is stabilized with respect to the rotor by the boss 45 secured to the central plate 31. The rotor may be secured to the shaft at the boss 45 by a suitable transverse fastening. The shaft 38 may be considered as fixed with respect to the rotor during operation. An inclined bar 46 is secured to the underside of the boom 15, and terminates in a horizontal lower extremity 47 forming a shelf for the support of the motor 44 in conjunction with the end bar 48.

A laterally extending plate 49 is braced by the diagonal 50 to provide for the adjustable positioning of the deflector arm 51 pivotally connected to the underside of the plate 49 as shown at 52. The arm 51 is forshortened in FIG. 2 to accommodate the assembly to the drawing space, and is long enough to position the deflector plates 53, stabilized by the webs 53a and 53b, secured to the outer extremity of the arm so that the inner end of the deflector plate is just radially outward of the path of movement of the flexible members 39-43. These members tend to straighten out under rotation. The angular position of the deflector arm 51 is determined by the engagement of the bolt 54 with a selected one of the holes 55 in the plate 49. The selection of this angular position will normally be made in the conjunction with the selected lateral position of the booms 15 and 16.

Figure 5:
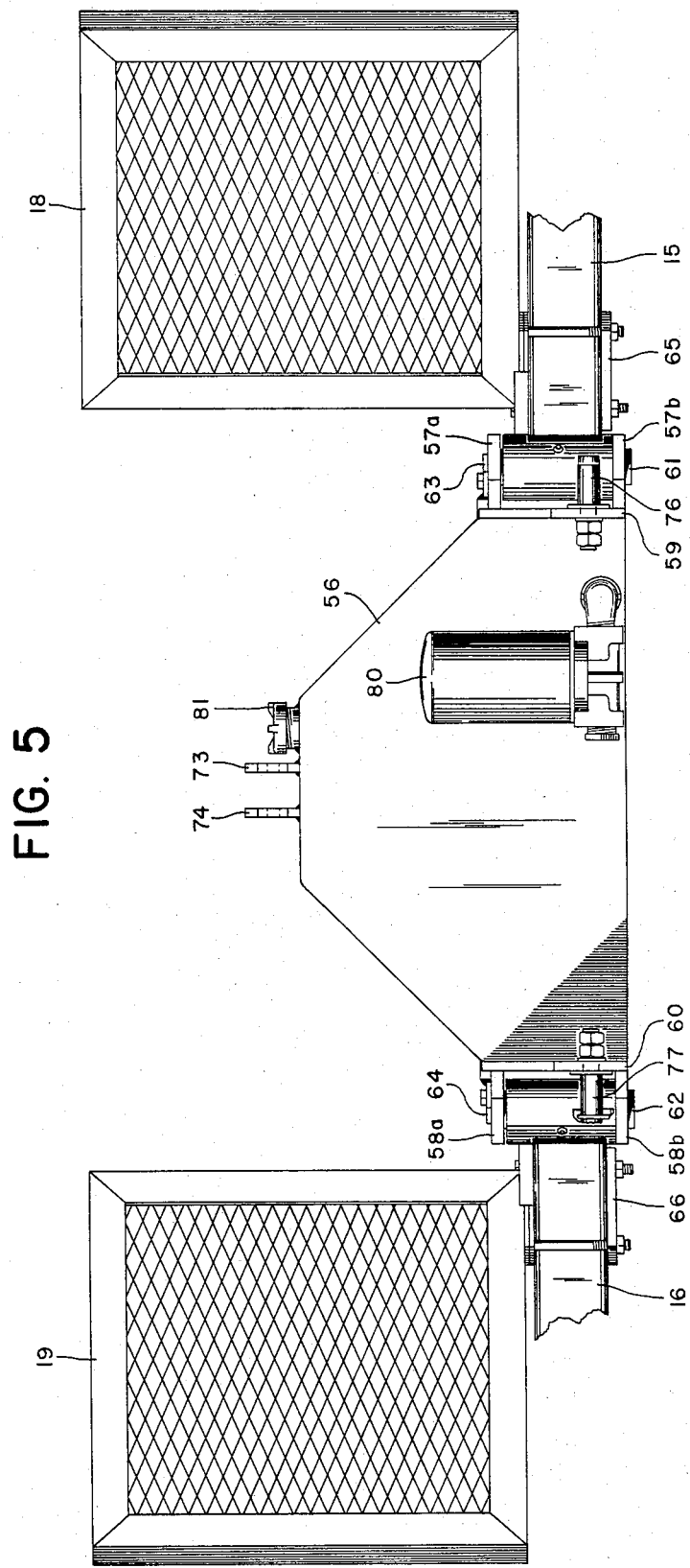
FIG. 5 is a front view with respect to FIG. 4.

Referring to FIGS. 4 and 5, the booms 15 and 16 are pivotally connected at their forward extremities to the central base structure indicated at 56, which is essentially a tank providing a supply of hydraulic fluid. The brackets 57a–b and 58a–b are respectively welded to the bars 59 and 60 which are welded to the sides of the tank 56. The pivot pins 61 and 62 traverse the brackets 57 and 58, respectively, and are held against axially disengagement by the tabs 63 and 64, which can be swung to and from a position opposite the ends of the pivot pins. The shields 18 and 19 are secured by clamp assemblies as indicated at 65 and 66 to their respective booms. The lateral position of the booms is controlled respectively by the hydraulic cylinders 67 and 68 connected at their forward ends to the bars 69 and 70 extending from the rear of the tank, and at their opposite extremities to the terminals 71 and 72 on the booms.

Figure 6:
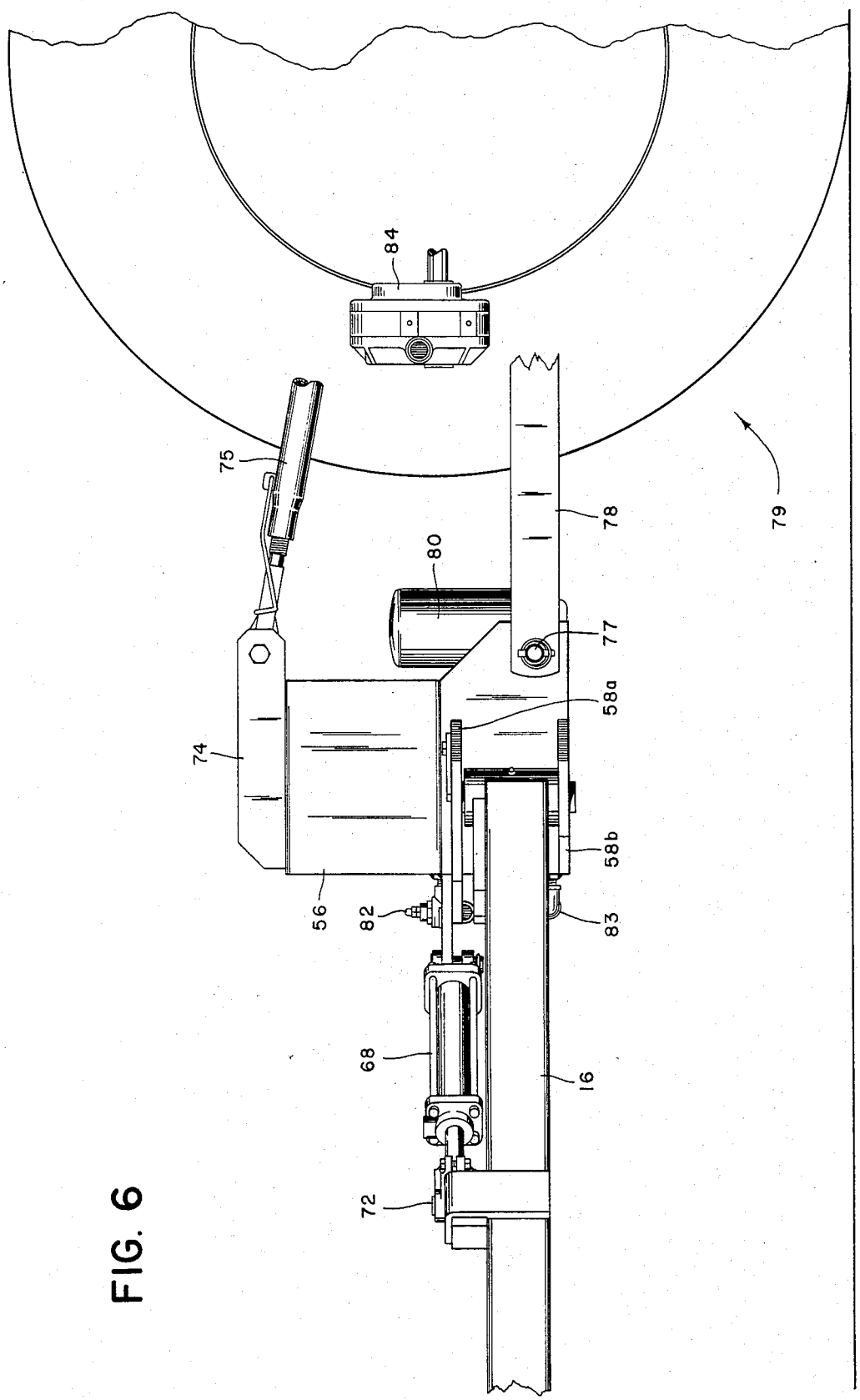
FIG. 6 is a side elevation of the base structure and the attachment linkage associating the base structure with the tractor. The shields have been removed for clarity.

The central base structure shown in FIGS. 4 and 5 is connected to the standard farm tractor through the system commonly used for other implements associated with the tractor. The spaced bars 73 and 74 welded to the top of the tank 56 provides the point of connection for the usual adjustable upper link as shown at 75 in FIG. 6. The shield 18 has been removed in FIG. 6. The laterally extending pins 76 and 77 appearing in FIG. 4 are fixed with respect to the bars 59 and 60, respectively, and receive the lower links 78 of the usual implement linkage of the tractor 79. These are vertically adjustable in the conventional tractor arrangement, and provide for selecting the vertical position of the central structure shown in FIGS. 4 and 5. This makes it possible to incline the axis of rotation of the rotors so that the forward portion of the rotors engages the ground, while the rear portion operates at clearance. With the rotors rotating so that the forward portions of the rotors are moving toward the center, the net result is a continuing tendency to urge the trash encountered by the sweeping rotors toward the center of the path of movement, where it is disengaged from the rotors by the deflector plates to be deposited in the center row 20.

FIG. 7 shows a schematic diagram of the hydraulic circuit. The oil filter 80, the fill cap 81, the pressure-relief unit 82, and the elbow 83 are standard fittings. (See FIG. 4). The pump 84 is provided on the tractor, and the pressure side of this pump is connected to one side of the pressure-relief unit 82, which relieves excess pressure in the line by discharging fluid back into the tank 56. The main output (on the other side of the unit) is connected by hydraulic lines to the motor 44. These lines are preferably steel tubes as shown at 85 in FIG. 2 secured to the side of the booms by clamps 86 and 87. One of the lines represents the exhaust from the motor, and carries back along the boom where it is transferred by flexible sections (not shown) over to the other boom lines to become the input to the other motor. The return from that motor is connected to the elbow 83, and thus returned to the tank. The usual flexible conduits at the opposite ends of the pipes have all been removed for clarity. Standard separate control values are provided for the positioning cylinders 67 and 68.

I claim:

1. A sweeping machine including vehicle means and at least one rotary sweeping device mounted on said vehicle means for rotation on a substantially vertical axis, wherein the improvement comprises:
   a boom mounted on said vehicle means for limited pivotal articulation about a vertical axis,
   said sweeping device including a central frame structure rotatably mounted for rotation on a substantially vertical axis at the outer extremity of said boom, and also including at least one upstanding arcuate paddle of flexible material extending outwardly from said central frame structure, with the convex side thereof disposed on the leading side with respect to the direction of rotation, and with the bottom edge of said convex side being free of structure attached thereto so that said convex side is positioned to engage the ground during normal sweeping operation therewith;
   ground-engageable support means mounted on one of said central frame structure and said boom for supporting the outer portion of said boom, together with said rotary sweeping device; and
   a normally fixed deflector member mounted on said boom, and including a plate extending substantially radially outward from the rotational path of movement of the outer extremity of said paddle, said plate being disposed to deflect material from said paddle and deposit the same in a row as said vehicle means moves forward; and
   drive means for said rotary sweeping device.

2. A machine as defined in claim 1, additionally including a platform structure forming a tank and carrying the mounting for said boom, said platform structure being vertically adjustable with respect to said vehicle means, said drive means including fluid pump means mounted on said platform structure and fluid motor means mounted on said booms and operable to drive said rotary sweeping devices.

3. A machine as defined in claim 1, wherein said machine has a plurality of booms each having a sweeping device, each of said booms also having said deflector member mounted for pivotal adjustment on a vertical axis adjacent the axis of rotation of said sweeping device.

* * * * *